(12) United States Patent
Kozera

(10) Patent No.: US 8,056,872 B2
(45) Date of Patent: Nov. 15, 2011

(54) HAND REMOVABLE BACKSTOP

(76) Inventor: Stanislaw J. Kozera, Dearborn Heights, MI (US)

(*) Notice: Subject to any disclaimer, the term of this patent is extended or adjusted under 35 U.S.C. 154(b) by 0 days.

(21) Appl. No.: 12/568,628

(22) Filed: Sep. 28, 2009

(65) Prior Publication Data

US 2010/0083805 A1  Apr. 8, 2010

Related U.S. Application Data

(63) Continuation of application No. 11/483,392, filed on Jul. 7, 2006, now Pat. No. 7,594,458, which is a continuation-in-part of application No. 10/872,328, filed on Jun. 18, 2004, now abandoned.

(60) Provisional application No. 60/480,717, filed on Jun. 23, 2003.

(51) Int. Cl.
    *E04G 25/00* (2006.01)
(52) U.S. Cl. .......... 248/200.1; 248/354.5; 83/29; 83/84; 83/94; 271/3.02
(58) Field of Classification Search ............. 248/346.02, 248/354.5, 200.1, 343, 354.1; 83/29, 84, 83/86, 87, 88, 89, 91, 94; 271/3.02, 207
See application file for complete search history.

(56) References Cited

U.S. PATENT DOCUMENTS

| | | | | |
|---|---|---|---|---|
| 3,062,537 A * | 11/1962 | Hanstein et al. | ............... | 271/187 |
| 3,313,191 A * | 4/1967 | Zakroff et al. | ................... | 83/89 |
| 3,556,326 A * | 1/1971 | Cline | ............... | 414/495 |
| 3,668,958 A * | 6/1972 | Kinsey | ............... | 83/88 |
| 3,935,769 A * | 2/1976 | Obenshain | ............... | 83/79 |
| 4,013,283 A * | 3/1977 | Tress et al. | ............... | 271/14 |
| 4,034,636 A * | 7/1977 | Pearl | ............... | 83/401 |
| 4,674,375 A * | 6/1987 | Golicz | ............... | 83/91 |
| 5,351,926 A * | 10/1994 | Moses | ............... | 248/354.5 |
| 5,697,742 A * | 12/1997 | House | ............... | 410/127 |
| 6,135,445 A * | 10/2000 | Gamperling et al. | ............... | 271/220 |
| 6,167,987 B1 * | 1/2001 | Jensen | ............... | 182/45 |
| 6,543,733 B1 * | 4/2003 | Pennington | ............... | 248/149 |
| 6,634,150 B1 * | 10/2003 | Oliver et al. | ............... | 52/292 |
| 2003/0189153 A1 * | 10/2003 | Nakabayashi et al. | ... | 248/346.02 |

* cited by examiner

*Primary Examiner* — Terrell McKinnon
*Assistant Examiner* — Bradley Duckworth
(74) *Attorney, Agent, or Firm* — Cantor Colburn, LLP

(57) ABSTRACT

A lightweight hand-removable backstop structure is provided, the backstop structure having: a backstop support; and an elongated substantially rigid structure arranged to be removably installed upon and rigidly supported in position by the backstop support, the elongated substantially rigid structure having first, second and third elongated sections, with first and third sections being generally vertically arranged, and the second section being generally horizontally arranged, the first section being configured to be hand-mounted upon and mechanically supported by the backstop support; the second section being disposed between and operatively rigidly interconnecting the first and third sections, the third section having at least one substantially flat large surface portion arranged to have a generally vertical orientation, the backstop structure being of sufficient length in a horizontal direction such that all of the third section and at least a portion of the second section extend over at least part of a pallet positioned therebelow, the large flat surface portion of the third section being configured to be generally perpendicular to the direction of advancing strips of sheet metal being severed and placed on the pallet.

14 Claims, 13 Drawing Sheets

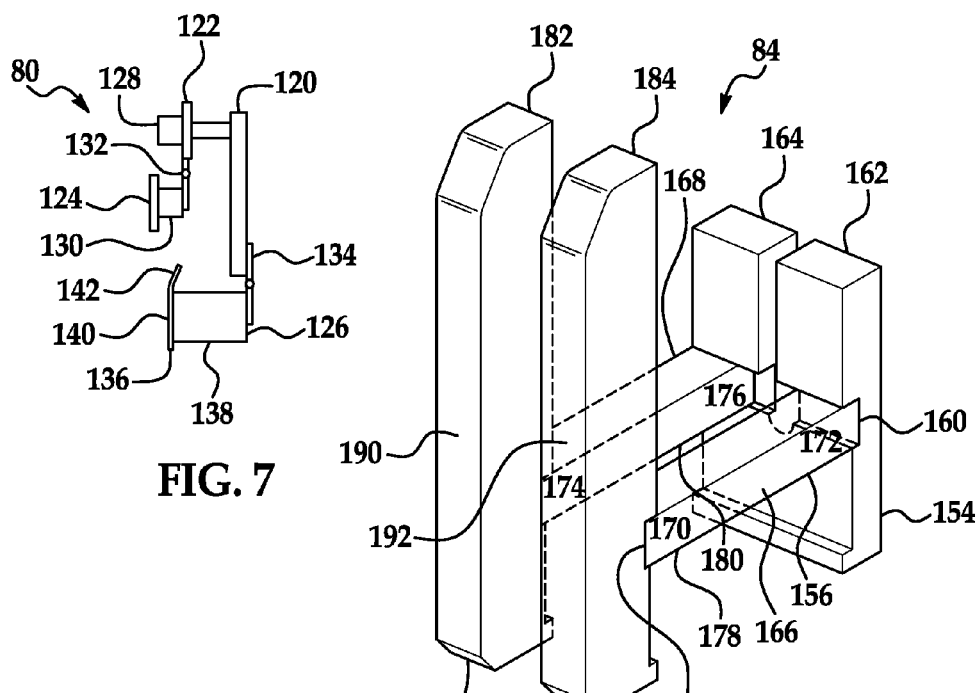
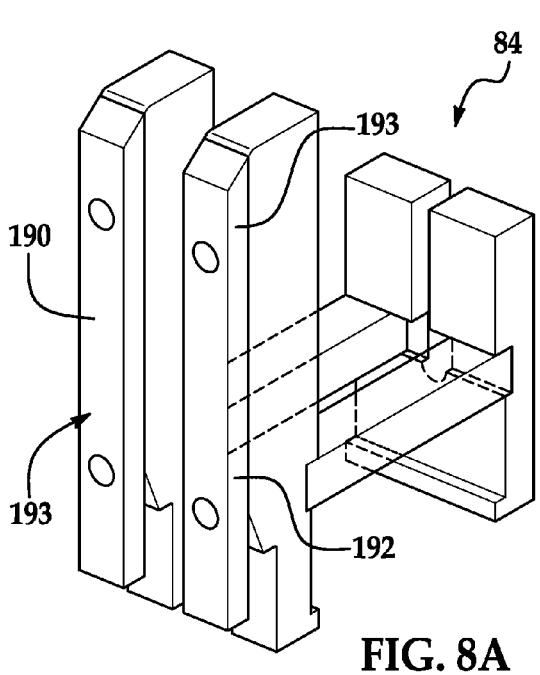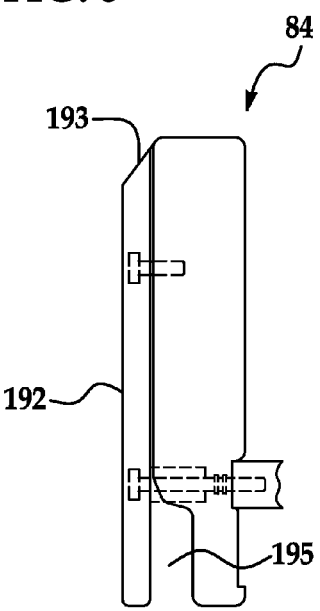

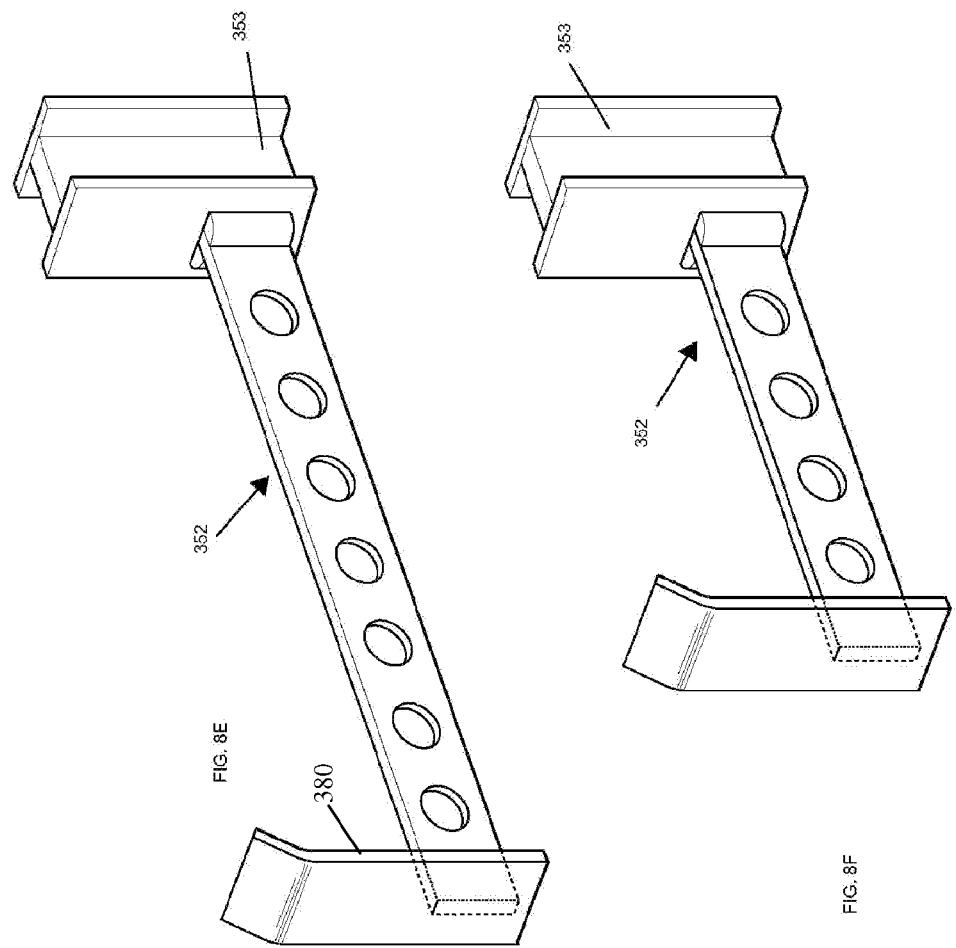

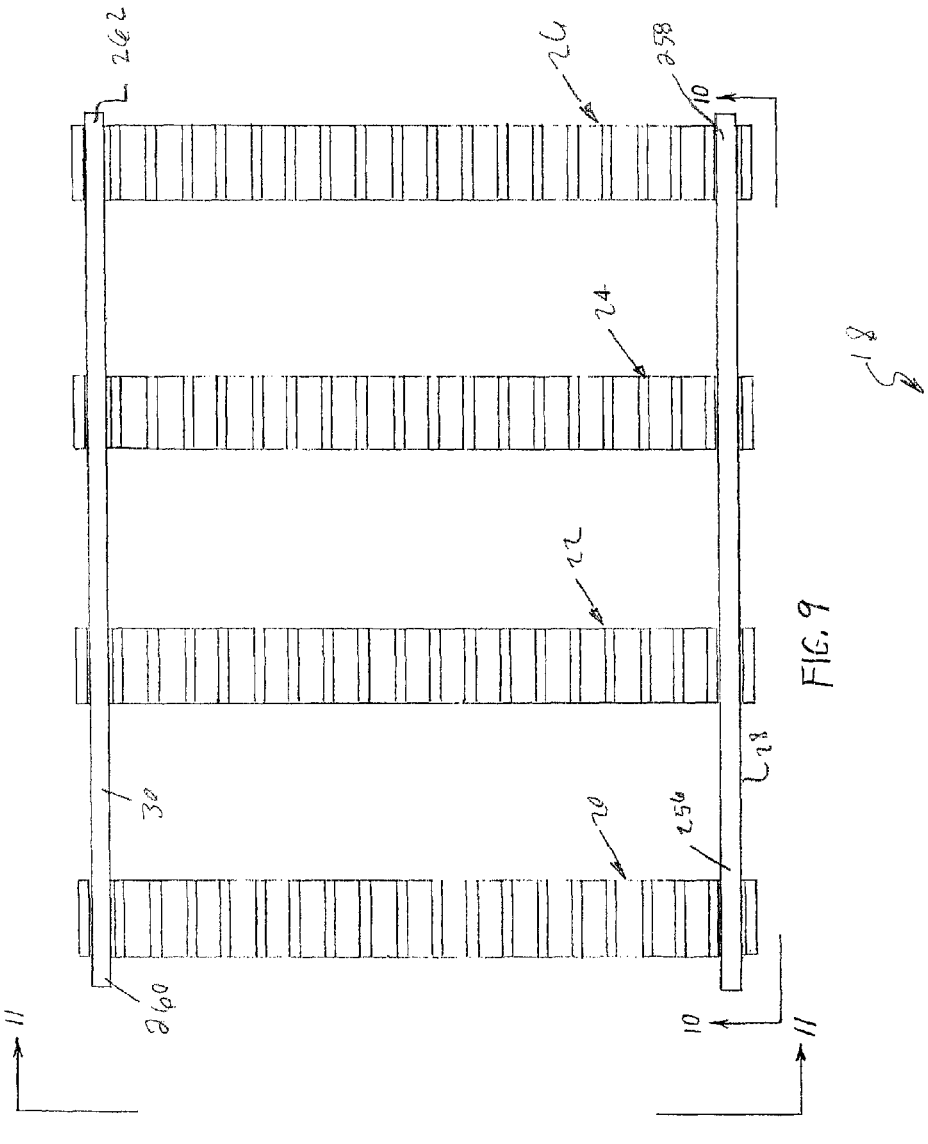
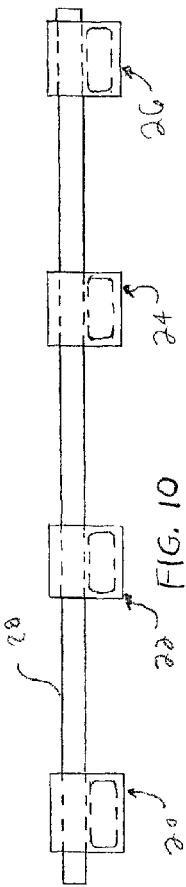
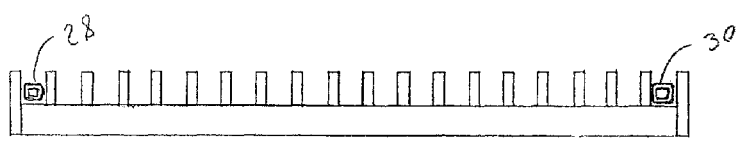

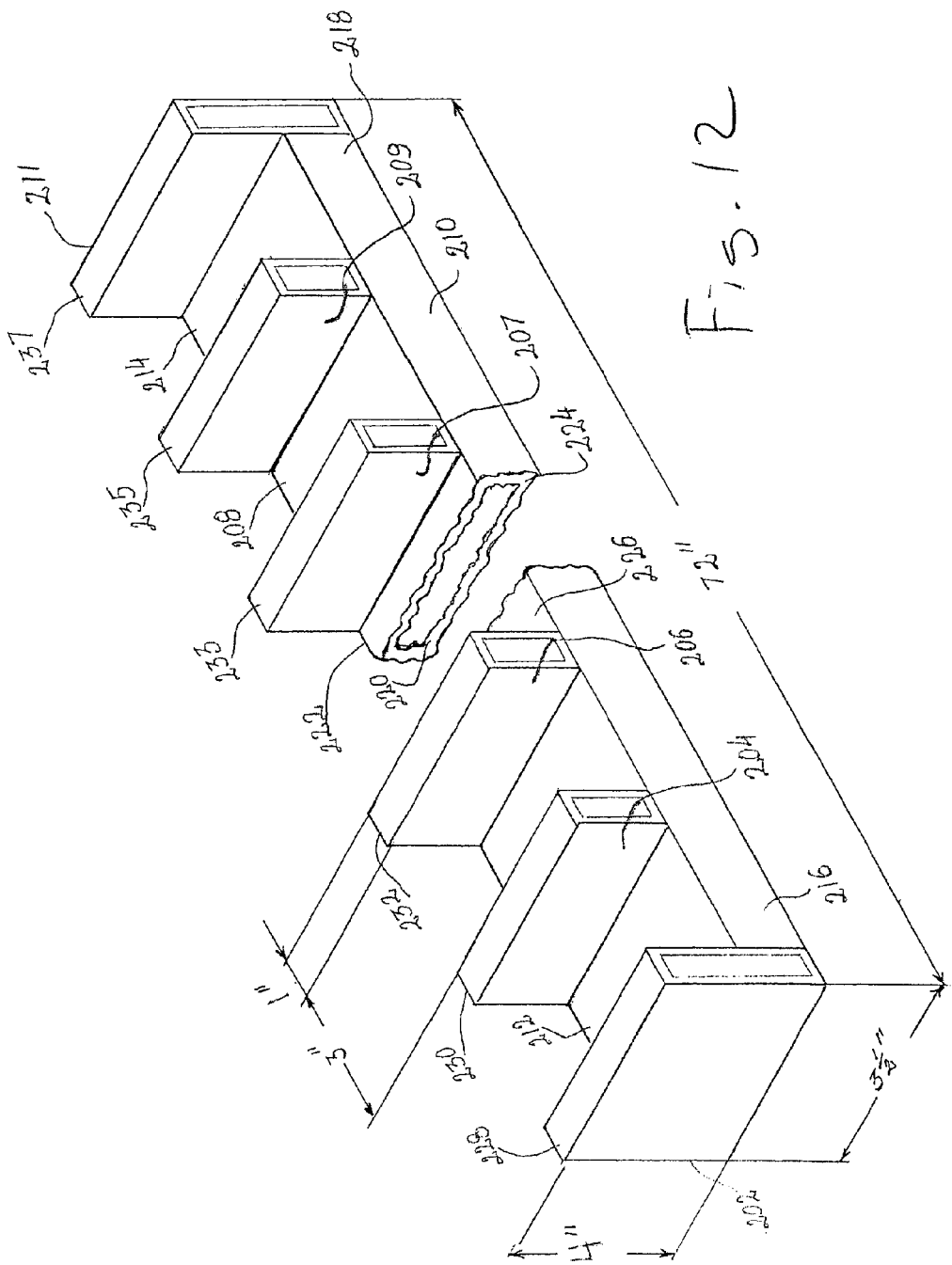

HAND REMOVABLE BACKSTOP

CROSS-REFERENCE TO RELATED APPLICATIONS

The present application is a continuation of U.S. Ser. No. 11/483,392 filed Jul. 7, 2006, which is continuation-in-part application of U.S. patent application Ser. No. 10/872,328, filed Jun. 18, 2004, the contents each of which are incorporated herein by reference thereto.

TECHNICAL FIELD

This application relates to a stacking system, a universal skid for use with the stacking system, and a method of assembling the universal skid.

BACKGROUND

Blanking machines have been developed to sever a large roll of metal sheet into several smaller flat sheets. Typically, the severed sheets are urged to a stacking mechanism that guides and stacks the sheets on a pallet disposed below the stacking mechanism.

The conventional pallet configuration is often a rectangular shaped pallet having a fixed-sized area for receiving metal sheets that have substantially the same size as the pallet. A drawback with this pallet configuration is that the area of the pallet for receiving sheets cannot be adjusted. As a result, when metal sheets having a plurality of different sizes are received, a plurality of pallets having different sizes are utilized for holding the sheets thereon.

For example, and referring to FIGS. 20-22, a special chain conveyor 1 has a plurality of 2×4s or other equivalent members 2 positioned in a transverse direction to the chains, thereafter a plurality of specially cut base members 3 are placed on the chain conveyor in a transverse direction to the 2×4s. The base members are configured to be received within the side guides 4 of the stacker. The base members are also configured to allow dividers 5 to pass therethrough when the base members are raised in between the side guides. Since the whole structure (2×4s and base members) is moved to the stacker center by the chain conveyor and/or other mechanical devices. The movement of this structure causes the base members to move and therefore their alignment to each other and ultimately the dividers is changed as they are not secured to each other and therefore they must be replaced to an orientation that aligns the base members up with the dividers of the stacking system such that when the pallet is lifted up towards the dividers, the same are allowed to pass between studs or extended members 6 of the base member comprising the pallet. These extended members are required to be placed between the dividers and side guides so that the base member and 2×4s are positioned to receive the cut pieces of metal 7 passing through the dividers.

As can be seen in FIGS. 20-22, the width of the placement of the dividers corresponds to the width of the metal being cut, which in turn requires the extended members or studs of the base members to be orientated as in FIG. 20 such that the extended members can pass between the dividers and the side guides of the stacker. Since the chain conveyor is raised up by a scissor lift or other equivalent device, a miss-alignment of just one of the base members may cause one of the studs to contact one of the side guides or dividers causing the operator to lower the lift and realign the base members in order to have the desired position illustrated in FIG. 20. This continuous alignment of base member adds time and cost to the stacking process. Moreover, and should one of the studs contact the divider this contact may bend or break the divider.

In addition, and as the width of the metal members varies so does the placement of the dividers (e.g., dividers are adjustable within side guides). Accordingly, various placements of the dividers are capable for multiple sized orders. In order to compensate for these various sized orders the configuration of the base members and the stud placement must also vary thus, a great amount of differently sized base members is required for use with a stacker system.

Accordingly, it is desirable to provide a pallet or skid for use with a stacker system wherein the receiving area is capable of receiving loads of varying sizes from a stacking system.

SUMMARY OF THE INVENTION

In accordance with an exemplary embodiment, a lightweight hand-removable backstop structure is provided, the backstop structure having: an elongated substantially rigid structure arranged to be removably installed upon and rigidly supported in position by a backstop support of the unloading and stacking mechanism, the rigid structure having first, second and third elongated sections, with first and third sections being generally vertically arranged when the backstop structure is in use, and second section being generally horizontally arranged when the backstop structure is in use, the first section being configured to be hand-mounted upon and mechanically supported by the backstop support; the second section being disposed between and operatively rigidly interconnecting the first and third sections, the third section having at least one substantially flat large surface portion arranged to have a generally vertical orientation when the backstop structure is in use, the backstop structure, when in use, being of sufficient length in a horizontal direction such that all of the third section and at least a portion of the second section extend over at least part of a pallet positioned therebelow upon which ejected pieces of cut-to-length sheet metal are stacked as they are severed by the blanking machine and dropped into the unloading and stacking mechanism, the large flat surface portion of the third section being configured to be generally perpendicular to the direction of the advancing strips of sheet metal prior to being severed, and the backstop structure being arranged to be positioned when in use to restrain the distal edges of the severed cut-to-length pieces of sheet metal as gravity causes them to drop, whereby the pieces of sheet of sheet metal drop into a stack upon the pallet with their restrained distal edges neatly arranged in a common generally vertical plane.

BRIEF DESCRIPTION OF THE DRAWINGS

FIG. 7 is a cross sectional view of the side guide of FIG. 6 along lines 7-7;

FIGS. 8-8B are perspective views of backstop members utilized in the stacking system of FIG. 1;

FIGS. 8D-8F are perspective views of backstop members in accordance with various exemplary embodiments of the present invention;

FIG. 9 is a top view of a skid utilized in the stacking system of FIG. 1 in accordance with an exemplary embodiment;

FIG. 10 is a side view of the skid of FIG. 9 along lines 10-10;

FIG. 11 is a side view of the skid of FIG. 9 along lines 11-11;

FIG. 12 is a perspective view of a support member utilized in the skid of FIG. 9 in accordance with an exemplary embodiment;

DETAILED DESCRIPTION OF EXEMPLARY EMBODIMENTS

Reference is made to the following U.S. Patent Publications Nos. 2007/0012149 and 2005/0016344 the contents each of which are incorporated herein by reference thereto. Reference is also made to the following U.S. Provisional Patent Application Ser. No. 60/480,717 filed Jun. 23, 2003 the contents of which are incorporated herein by reference thereto.

Figure 18:
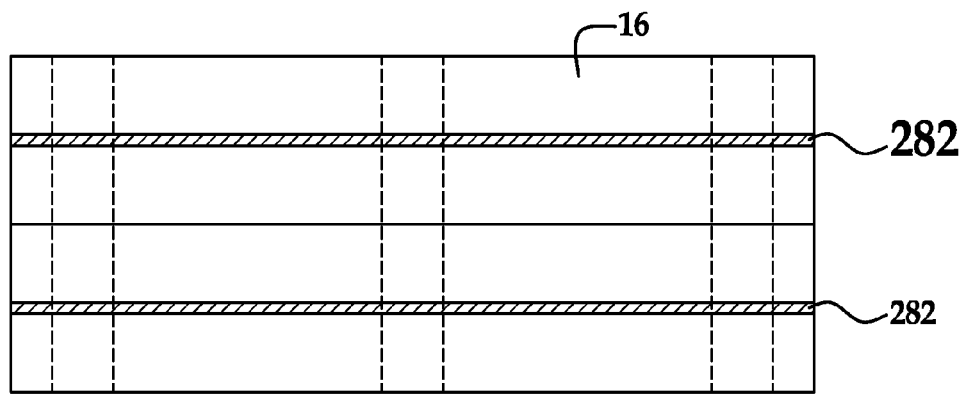
FIG. 18 is a top view of a plurality of sheets banded together in the longitudinal direction.
Figure 19:
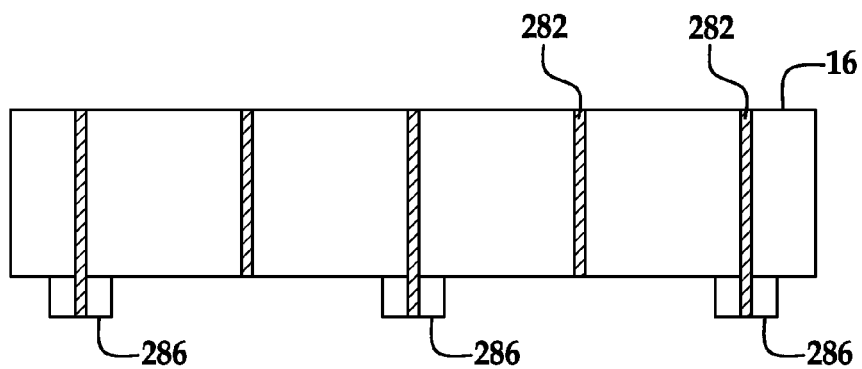
FIG. 19 is a side view of a plurality of sheets banded together in the transverse direction.
Figure 20:
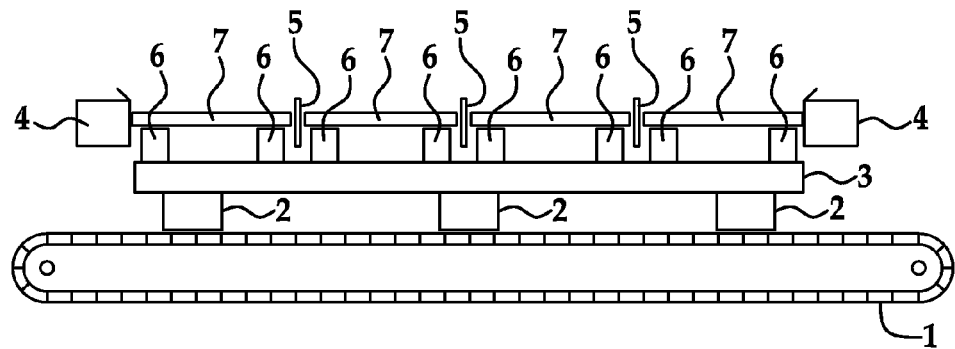
FIGS. 20-22 are views of prior devices and methods used with stacker systems.
Figure 21:
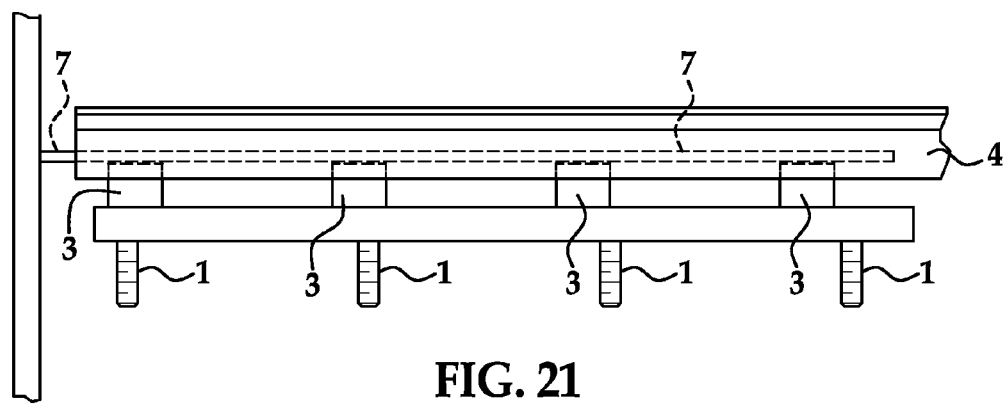
Figure 22:
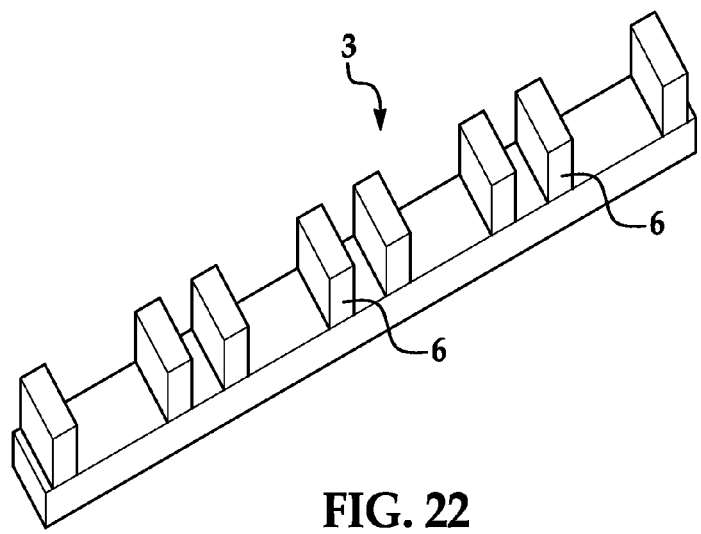

In accordance with an exemplary embodiment, the stacking system is capable of being used with all kinds of orders when different widths of cut metal sheets are provided and the customer requires a bundle of cut blanks to be put on a skid member in accordance with an exemplary embodiment of the present invention (See FIGS. 18-19).

Figure 1:
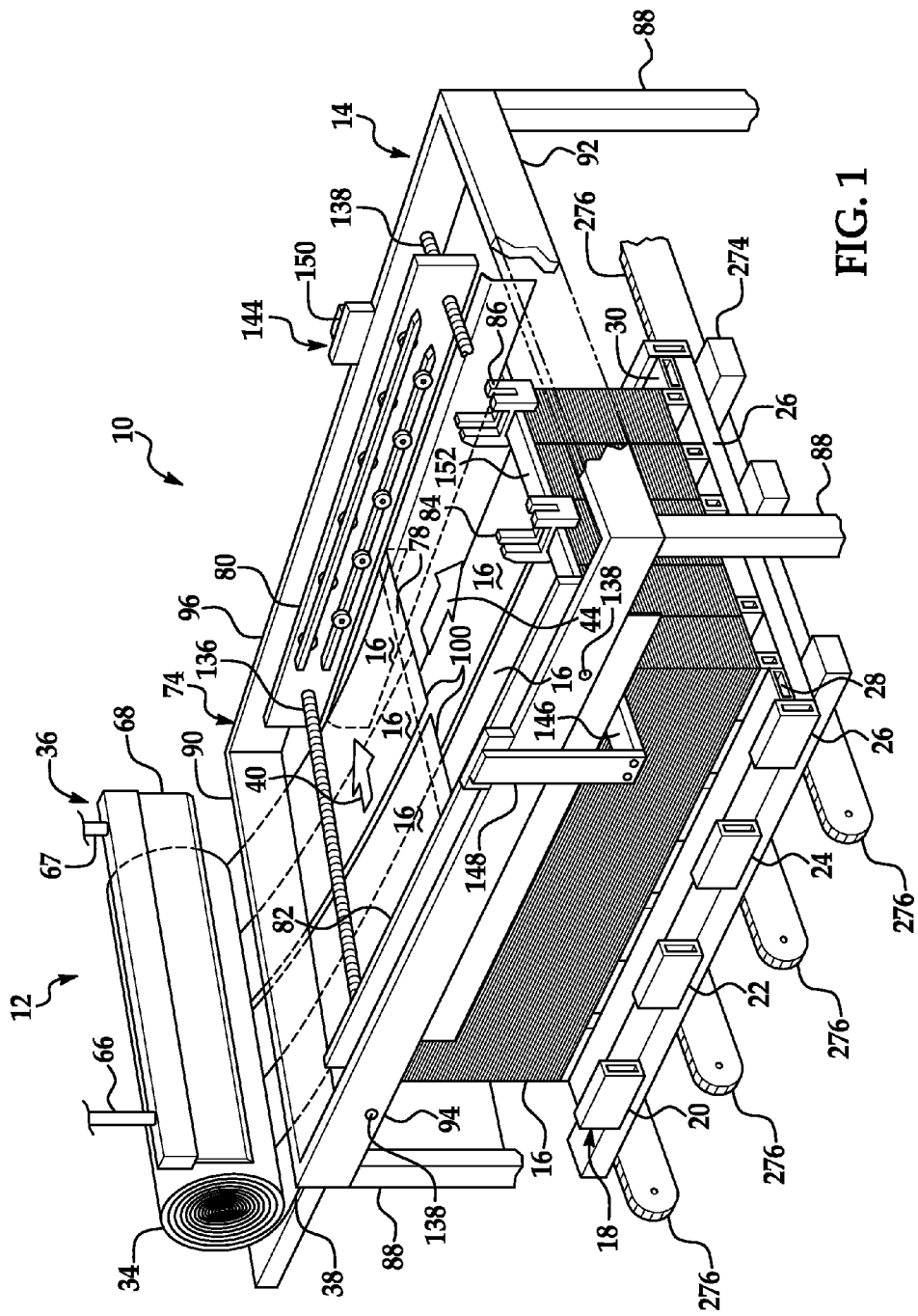
FIG. 1 is a perspective view of a stacking system having a blanking machine, a stacking mechanism, and a skid in accordance with an exemplary embodiment.
Figure 2:
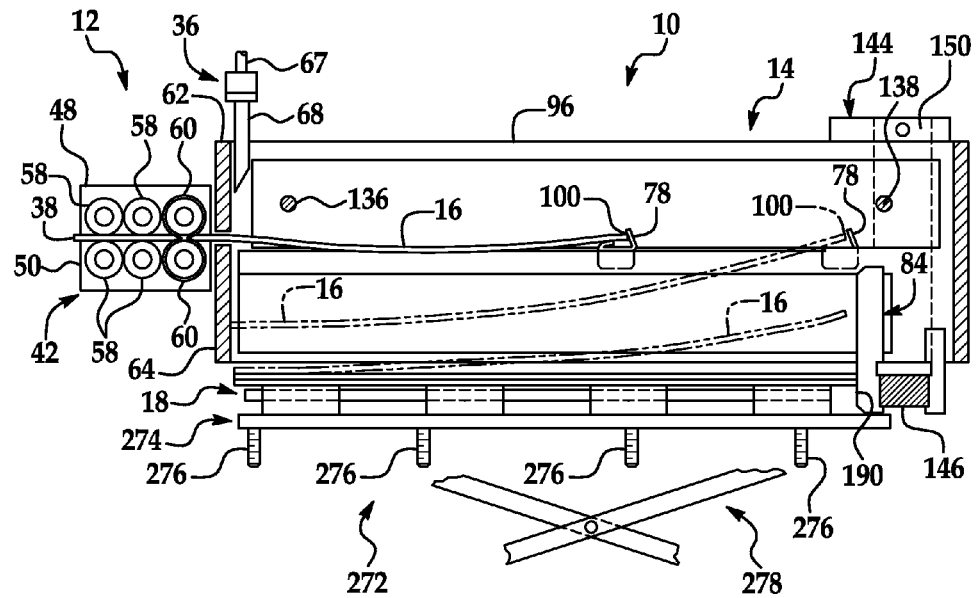
FIG. 2 is a side view of the stacking system FIG. 1.
Figure 3:
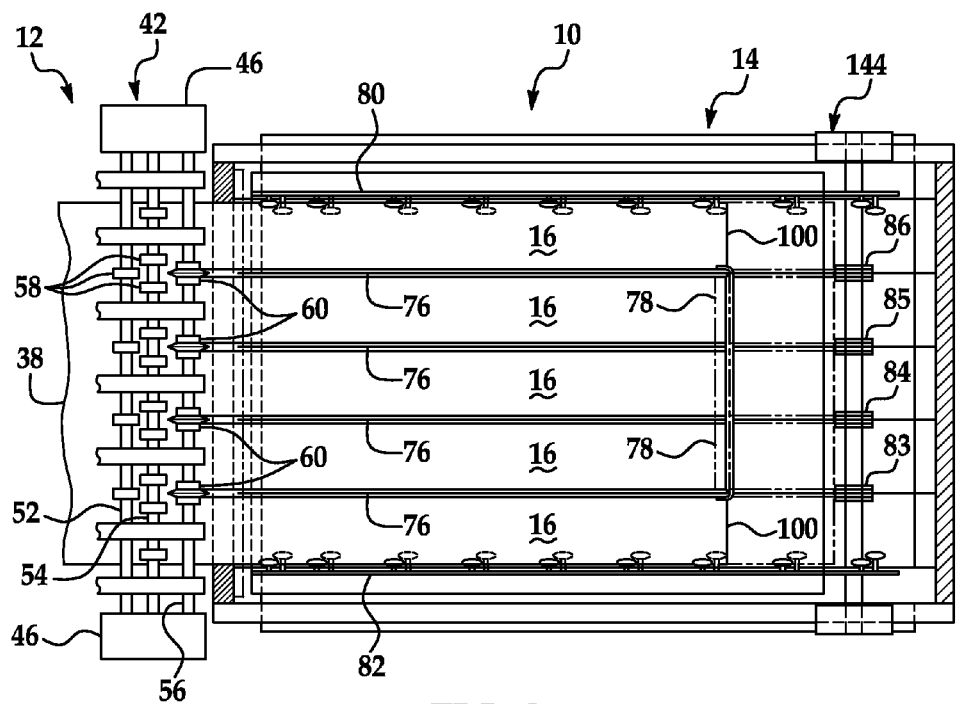
FIG. 3 is a top view of the stacking system FIG. 1.

Referring now to FIGS. 1-3, a stacking system 10 for stacking a plurality of metal sheets in accordance with an exemplary embodiment is provided. Stacking system 10 includes a blanking machine 12, a stacking mechanism 14, a plurality of stacks of severed sheets 16, and a skid 18 configured to receive stacks of sheets 16. Skid 18 includes a plurality of support members 20, 22, 24, 26 and connecting members 28, 30.

A brief explanation of the blanking machine 12 will now be provided. Reference is also made to U.S. patent application Ser. No. 10/872,328, filed Jun. 18, 2004, which is incorporated herein by reference thereto. Blanking machine 12 receives an uncut metal roll 34 for cutting into a plurality of smaller flat sheets 16. Blanking machine 12 includes a transverse cutter mechanism 36 for severing an unrolled sheet portion 38 in the transverse direction 40 and a longitudinal cutter mechanism 42 for severing sheets in the longitudinal direction 44. Longitudinal cutter mechanism 40 is configured to advance unrolled sheet portion 38 toward the stacking mechanism 14. Longitudinal cutter mechanism 42 is further configured to sever sheet portion 38 in the longitudinal direction 44 before the sheet portion 38 is severed by the transverse cutter mechanism 36. In particular, transverse cutter mechanism 36 severs sheet portion 38 in the transverse direction 40, forming sheet 16 having dimensions smaller in the transverse and longitudinal directions 40, 44 compared to uncut sheet portion 38. Severed sheet 16 is then urged toward the stacking mechanism 14 by sheet portion 38 being advanced in the longitudinal direction 44 by longitudinal cutter mechanism 42.

As shown in FIGS. 2 and 3, longitudinal cutter mechanism 42 includes a gear transmission drive 46, an upper roller and cutter assembly 48, and a lower roller and cutter assembly 50. Upper roller and cutter assembly 48 and lower roller and cutter assembly 50 each include three parallel spaced drive shafts 52, 54, 56, a plurality of drive rollers 58, and a plurality of rotating cutters 60. Gear transmission drive 46 provides power to rotate drive shafts 52, 54, 56 thereby rotating drive rollers 58 and rotating cutters 60. Drive rollers 58 are spaced along the lengths of drive shafts 52, 54. Rotating cutters 60 are spaced along the length of drive shaft 56. The positions of drive rollers 58 and rotating cutters 60 disposed along the lengths of drive shafts 52, 54, 56 can be configured to suit the width in the transverse direction 40 of sheets 16 to be severed in blanking machine 12.

Referring to FIGS. 1-3 and 8C, transverse cutter mechanism 36 includes an upper guide plate 62, a lower guide plate 64, reciprocating drive shafts 66, 67 and a shearing blade 68. Upper guide plate 62 and lower guide plate 64 are disposed proximate rotating cutters 60 of longitudinal cutter mechanism 42. Upper and lower guide plates 62, 64 are spaced apart in a manner to maintain sheet portion 38 in substantially the same plane as when the sheet portion 38 passes between the upper and lower roller and cutter assemblies 48, 50. Shearing blade 68 is disposed proximate upper guide plate 62 and cuts sheet portion 38 in the transverse direction 40 as shearing blade 68 is urged downward by reciprocating drive shaft 66. Reciprocating drive shafts 66, 67 are configured to urge shearing blade 68 in an up and down motion. Upper guide plate 62 is configured to maintain shearing blade 68 in substantially a single plane as shearing blade 68 moves downward to severe sheet portion 38, to form sheets 16. Sheets 16 are then urged toward stacking mechanism 14 by sheet portions 38 which are urged by drive rollers 58 of longitudinal cutter mechanism 42.

Stacking mechanism 14 is provided to guide sheets 16 coming from blanking machine 12 to skid 18 disposed below stacking mechanism 14. Stacking mechanism 14 includes a frame 74, a plurality of dividers 76, top guide 78, side-guides 80, 82, and a plurality of backstop members 83, 84, 85, 86, and 87. Dividers 76 are movably secured to the system such that the width therebetween can be varied to receive differently sized metal pieces.

FIG. 1 also shows that the unloader and stacking mechanism also includes a side-restraint or side guide system to help ensure that the severed sheets fall neatly onto the growing stack below on the pallet, by guiding and constraining the permissible location of the left and right outer edges of the severed sheets on the growing stack. The guide system includes the left and right longitudinally arranged side guide assemblies, and transversely arranged horizontal support rods or screws 136 and 138, on which side guides are slidably adjustable inwardly and outwardly. The side guide assemblies 80 and 82 respectively include elongated longitudinally arranged generally flat support plates and longitudinally arranged generally flat side guides hinged to hanging downwardly therefrom.

Frame 74 provides support for various guide apparatus attached to stacking mechanism 14. Guide apparatus such as dividers 76, top guide 78, side guides 80, 82, and backstop members 83, 84, 85, 86, and 87 are provided to guide sheets 16 to skid 18 in an manner to form ordered stacks of sheets 16 on top of skid 18.

Referring to FIG. 1, frame 74 includes four vertical support legs 88, transverse frame members 90, 92, and longitudinal frame members 94, 96. Transverse frame members 90, 92 and longitudinal frame members 94, 96 are configured to provide a substantially open rectangular shape for receiving sheets 16. Transverse and longitudinal frame members further provide support and attachment locations at which guide apparatuses can be attached.

Referring to FIG. 3, a plurality of dividers 76 are provided to guide the longitudinal edges of sheets 16 in a downward direction toward skid 18. Dividers 76 are elongated substantially thin flat metal strips disposed in the longitudinal direction 44 and spaced substantially parallel with respect to each other. The end portions of dividers 76 are configured to be coupled to transverse frame members 90, 92. The number of dividers 76 used and their placement along transverse frame members 90, 92 is based on the width of sheets 16 and the number of sheets 16 in the transverse direction 40. For example, two dividers 76 are disposed between side-guides 80, 82 for metal roll 34 that will be severed in the transverse direction 40 to form three sheets 16 where each sheet 16 has a substantially equal width in the transverse direction 40.

Figure 4:
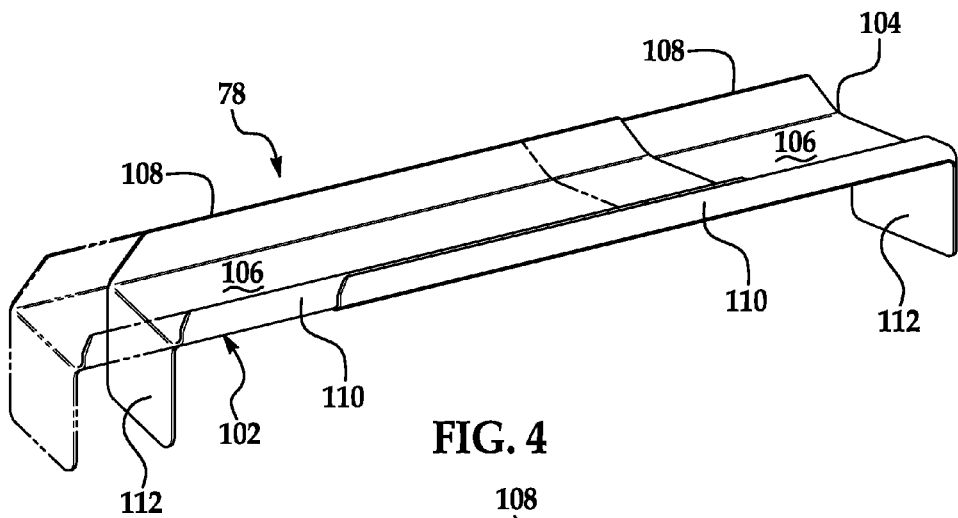
FIG. 4 is a perspective view of a top guide utilized in the stacking system of FIG. 2.

Referring to FIGS. 2 and 4, top guide 78 is provided to maintain front edges 100 of sheets 16 in a substantially straight line with respect to each other as sheets 16 are being advanced toward backstop members 83, 84, 85, 86, and 87. Top guide 78 rests on the upper edges of dividers 76 in the transverse direction 40. In one non-limiting embodiment, top guide 78 includes telescoping portions 102, 104. Telescoping portions 102, 104 are configured to substantially slide against each other so the length of top guide 78 in the transverse direction 40 is adjustable. Portion 102 is substantially similar to portion 104, so only the details of portion 102 will be discussed.

Telescoping portion 102 includes a central wall 106, a rear wall 108, a front wall 110, and a sidewall 112. Central wall 106 is configured as an elongated, substantially planar member that rests on the upper edges of dividers 76. Rear wall 108 extends substantially the length of central wall 106. Rear wall 108 is further configured to angularly depend away from central wall 106 defining a substantially perpendicular angle, or an acute angle, between central wall 106 and rear wall 108. Front wall 110 extends substantially the length of central wall 106 and angularly depends away from central wall 106 in a direction to form a channel shape with respect to rear wall 108. Front wall 110 is further configured so that front wall 110 forms an acute angle with respect to central wall 106 that is substantially less than the angle between rear wall 108 and central wall 106. Sidewall 112 depends away from an end portion of central wall 106 that defines an angle between sidewall 112 and central wall 106 that is substantially perpendicular.

Referring to FIGS. 2-5, telescoping portions 102, 104 of top guide 78 are disposed on stacking mechanism 14 such that central wall 106 rests on the upper edges of dividers 76. Top guide 78 is initially placed on dividers 76 proximate blanking machine 12 at a location to receive front edges 100 of sheets 16. In particular, top guide 78 is disposed on dividers 76 such that sidewalls 112 of telescoping portions 102, 104 extend between dividers 76 toward skid 18 below stacking mechanism 14. Telescoping portions 102, 104 are further disposed on dividers 76 such that central wall 106 of telescoping portion 104 is disposed on central wall 106 of telescoping portion 102. Further, telescoping portion 104 nestles within telescoping portion 102 such that rear wall 108 of portion 104 substantially slides against rear wall 108 of portion 102. Similarly, front wall 110 of telescoping portion 104 substantially slides against front wall 110 of telescoping portion 102. To adjust the transverse 40 length of top guide 78, a user can first move telescoping portions 102, 104 upward until sidewalls 112 clear the upper edges of dividers 76. Thereafter, the user can slide telescoping portions 102, 104 along each other to a desired length. Thereafter, the user can lower telescoping portions 102, 104 of top guide 78 such that central walls 106 rest on dividers 76 and sidewalls 112 are in between dividers 76.

Top guide 78 is initially positioned on dividers 76 proximate blanking machine 12 so that the front portion of the initial sheets 16 coming off the blanking machine 12 contact top guide 78. Front edges 100 of sheets 16 contact an inside surface of rear wall 108 of top guide 78 and a bottom surface of sheets 16 contacts an upper portion of front wall 110. As sheets 16 are being urged from blanking machine 12, sheets 16 urge top guide 78 to slide along the upper edges of dividers 76 toward backstop members 83, 84, 85, 86, and 87. As sheets 16 are urged toward backstop members 83, 84, 85, 86, and 87, top guide 78 maintains front edges 100 of sheets 16 in a substantially straight line in the transverse direction 40. Thereafter, the front edges drop between the dividers before the backstop members.

Figure 4A:
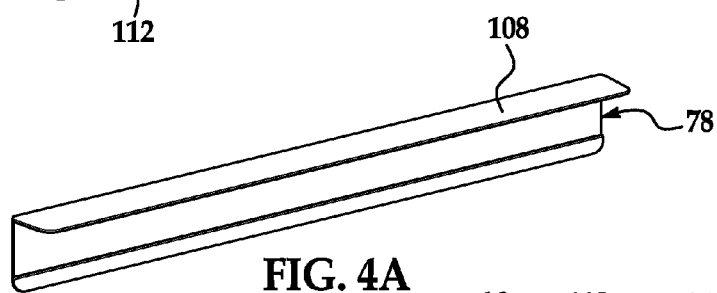
FIG. 4A is a perspective view of an alternative top guide utilized in the stacking system of FIG. 2.
Figure 5:
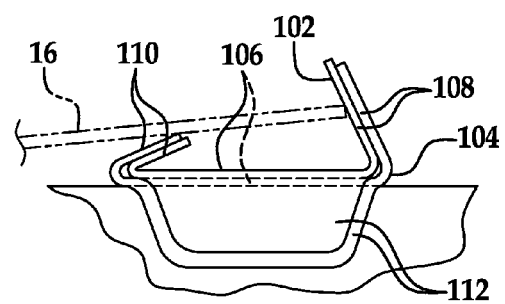
FIG. 5 is a side view of a portion of the top guide of FIG. 4 contacting a severed sheet.

In an alternative exemplary embodiment, top guide 78 comprises an "L" shaped member wherein an edge portion of top guide 78 provides a means for providing a stop for sheets 18. In one non-limiting exemplary embodiment, the top guide comprises a single unitary member. In this embodiment, there will be several pieces or top guides of different lengths for use as the widths of the sheets varies. One non-limiting example is shown in FIG. 4A.

Referring now to FIGS. 1-3, 6 and 7, side guides 80, 82 are provided to guide the outermost longitudinal edges 114 of sheets 16 as sheets 16 fall toward skid 18. Side-guides 80, 82 guide longitudinal edges 114 along substantially in a single plane with respect to each other as sheets 16 are being stacked on skid 18. Side guides 80, 82 are disposed within the interior of stacking mechanism 14, substantially parallel to longitudinal frame members 94, 96 respectively, and with a portion extending below dividers 76. The placement of side guides 80, 82 in stacking mechanism 14 in the transverse direction 40 corresponds substantially to the total transverse 40 length of the number of sheets 16 being guided by stacking mechanism 14. The configuration of side guide 80 within stacking mechanism 14 is substantially similar to that of side guide 82, therefore only the details of side guide 80 will be provided.

Side guide 80 includes a support member 120, a plurality of upper rollers 122, a plurality of lower rollers 124, and a guide support member 126. Support member 120 provides attachment locations for upper and lower rollers 122, 124 and guide support member 126. Support member 120 is an elongated rectangular member coupled to frame 74. In alternative embodiments, the configuration of support member 120 can include a plurality of members that when coupled together are substantially similar to the embodiment illustrated.

Upper rollers 122 and lower rollers 124 are used for a guiding process other than guiding sheets 16 to skid 18, therefore their function will not be discussed herein. Upper rollers 122 are spaced along and coupled to an elongated upper roller support member 128. Upper roller support member 128 is spaced apart from and coupled to an upper side portion of support member 120. Lower rollers 124 are spaced along and coupled to an elongated lower roller support member 130. Lower roller support member 130 is positioned substantially below upper roller support member 128. Lower roller support member 130 is coupled to upper roller support member 128 with a plurality of hinge members 132. Lower roller support member 130 rotates about hinge members 132 in a direction away from upper rollers 122 and toward support member 120. When stacking mechanism 14 is operating to guide sheets 16 toward skid 18, lower rollers 124 are rotated in a direction away from upper rollers 122 toward longitudinal frame member 96.

Guide support member 126 is configured to provide a surface to guide a portion of sheets 16 toward skid 18 during the operation of stacking mechanism 14. Guide support member 126 is further configured to include a surface to be contacted by a portion of skid 18 before any portion of skid 18 contacts dividers 76 when skid 18 is being positioned beneath dividers 76. Guide support member 126 is an elongated member extending substantially the length of support member 120. Guide support member 126 is disposed substantially beneath upper and lower rollers 122, 124 and beneath dividers 76. Guide support member 126 is coupled to support member 120 with a plurality of hinge members 134 so that guide support member 126 rotates in a direction away from lower rollers 124.

Figure 6:
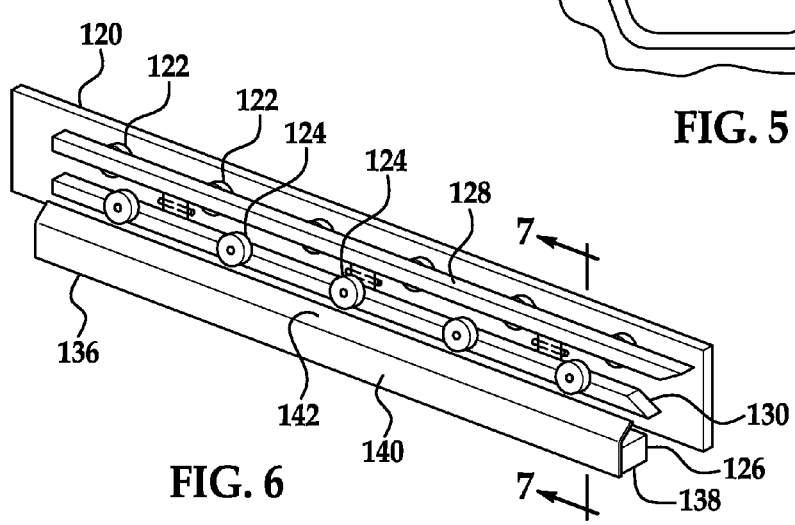
FIG. 6 is a perspective view of a side guide utilized in the stacking system of FIG. 1.

Referring to FIGS. 6 and 7, guide support member 126 includes a workpiece contact member 136 and a skid contact surface 138. Workpiece contact member 136 includes a contact surface 140. Workpiece contact member 136 is an elongated member extending substantially along the length of and coupled to guide support member 126. Workpiece contact member 136 is coupled to a position on guide support member 126 that is substantially beneath lower rollers 124 when guide support member 126 is rotated to a position substantially below lower rollers 124. Guide support member 126 is configured to rotate toward a position where falling sheets 16 will deflect from contact surface 140 toward skid 18. Contact surface 140 is an elongated, substantially flat surface configured to be contacted by the longitudinal edges 114 of outboard most sheets 16 as sheets 16 fall toward skid 18.

Workpiece contact member 136 includes an upper flat portion 142 that angularly depends away from contact surface 140 toward the longitudinal frame member 96 when side guide 80 is coupled to transverse frame members 90, 92. Upper flat portion 142 is configured to deflect the longitudinal edges 114 of outboard most sheets 16 toward skid 18 along contact surface 140 if sheets 16 hit upper flat portion 142 of the workpiece contact member 136. Side guide 80 is further configured so that contact surface 140 of workpiece contact member 136 and upper flat portion 142 are substantially parallel to dividers 76 when side guide 80 is coupled to frame 74 in a position to guide longitudinal edges 114 of outboard most sheets 16. Alternative configurations of guide support member 126 include configurations where contact surface 140 or upper flat portion 142 are an integral portion of guide support member 126.

Skid contact surface 138 of guide support member 126 is positioned and configured to contact a portion of skid 18 as skid 18 is being positioned beneath stacking mechanism 14. In this embodiment, skid contact surface 138 is a surface of guide support member 126. Skid contact surface 138 is an elongated substantially flat surface disposed on a lower portion of guide support member 126. Guide support member 126 and skid contact surface 138 are further configured so that skid contact surface 138 contacts a portion of skid 18 before skid 18 would make contact with dividers 76 when skid 18 is being positioned beneath dividers 76, thereby avoiding damaging dividers 76 while positioning skid 18 beneath dividers 76. In essence, the length of the support members (20, 22, 24, 26) is greater than a width between the pair of side guides so that when the scissor lift is raised a surface of some of the plurality of extension members, typically located at the end portion, of the support members makes contact with a bottom surface of the side guides prior to other extension members (disposed in the inner portion of the support member) making contact with a bottom portion of the dividers. Moreover, the distance between each of the plurality of extension members no longer needs to be specifically modified as there is no requirement for the plurality of extension members to be received within each of the dividers in order to prevent damage of the same. In addition, there is no requirement for the support members to be readjusted as long as they are in position to contact a bottom portion of the side guides.

Referring to FIGS. 1-3 and 8A, 8B, 8E and 8F, backstop members 83, 84, 85, 86, and 87 are provided for guiding front edges 100 of sheets 16 to skid 18 after sheets 16 are urged from blanking machine 12. Backstop members 83, 84, 85, 86, and 87 are supported and coupled to a backstop support member 144. Backstop support member 144 is configured to be coupled to longitudinal frame members 94, 96. The position of backstop support member 144 along longitudinal frame members 94, 96 corresponds to the longitudinal 44 length of sheets 16 being guiding by stacking mechanism 14.

Backstop support member 144 includes a horizontal bar member 146 and vertical bar members 148, 150. Horizontal bar member 146 is an elongated substantially rectangular shaped member extending in the transverse direction 40 between longitudinal frame members 94, 96 of stacking mechanism 14. Horizontal bar member 146 further includes an upper surface 152 configured to receive a portion of backstop members 83, 84, 85, 86, and 87. Each end portion of horizontal bar member 146 is configured to be coupled to a portion of vertical bar members 148, 150, respectively. Vertical bar members 148, 150 are each coupled to longitudinal frame member 94, 96, respectively.

Backstop members 83, 84, 85, 86, and 87 are configured to be disposed along a plurality of positions in the transverse direction 40 on upper surface 152 of horizontal bar member 146 of backstop support member 144. The position and number of backstop members 83, 84, 85, 86, and 87 used along backstop support member 144 corresponds to the transverse 40 length of sheets 16 being guiding by stacking mechanism 14. Backstop members 83, 84, 85, 86, and 87 are further configured to slidably receive divider 76 to secure backstop members 83, 84, 85, 86, and 87 from moving substantially in the transverse direction 40 while stacking mechanism 14 is in operation. Backstop member 84 is configured substantially similar to backstop members 83, 85, 86, and 87 therefore only the details of backstop member 84 will be discussed.

Referring to FIG. 8, an exemplary embodiment of backstop member 84 is illustrated. Backstop member 84 includes rear member 154, a central member 156, and a front member 158. As described in U.S. patent application Ser. No. 10/872,328 front member or members 158 are widened such that the front surface of front member 158 will be flush with a stacking surface as shown in FIGS. 18 and 19 of U.S. patent application Ser. No. 10/872,328. Rear member 154, central member 156, and front member 158 are configured to form an H-shaped configuration when coupled together. Rear member 154 includes a channel shaped groove 160 and spaced rear portions 162, 164 disposed above groove 160. Central member 156 includes two substantially parallel spaced bar shaped members 166, 168. Bar members 166, 168 have end portions 170, 172, 174, 176, respectively. Bar members 166, 168 each also have lower surfaces 178, 180 respectively, configured to be disposed on upper surface 152 of horizontal bar member 146 of backstop support member 144. End portions 170, 172 are configured to be coupled to groove 160 of rear member 154.

Front member 158 includes spaced front portions 182, 184. Each front portion 182, 184 includes a groove 186, 188, respectively, configured to be coupled to end portions 174, 176 of bar members 166, 168, respectively. Front portions 182, 184 each further include an elongated substantially flat surface 190, 192, respectively. Backstop member 84 is further configured so that flat surfaces 190, 192 share a substantially common plane where the plane is substantially perpendicular to a plane defined by lower surfaces 178, 180 of bar members 166, 168. Backstop member 84 is further configured so the space between front portions 182, 184 substantially aligns with the space between rear portions 162, 164. The aligned spaces permit divider 76 to be slidably received within the spaces when backstop member 84 is disposed on horizontal bar member 146.

Referring now to FIGS. 8A and 8B an alternative construction of a backstop member is illustrated. Here flat surface 190, 192 is provided by securing an extension member 193 to the backstop member in order to extend surface 190 and 192 down past the recessed area 195 shown in FIG. 8B. Thus, a uniform front surface of front member will be flush with a stacking surface as shown in FIGS. 18 and 19 of U.S. patent application Ser. No. 10/872,328. In addition, the width of extension member 193 may also be increased to be greater than the width of the backstop member to which extension member 193 is secured.

Figure 8C:
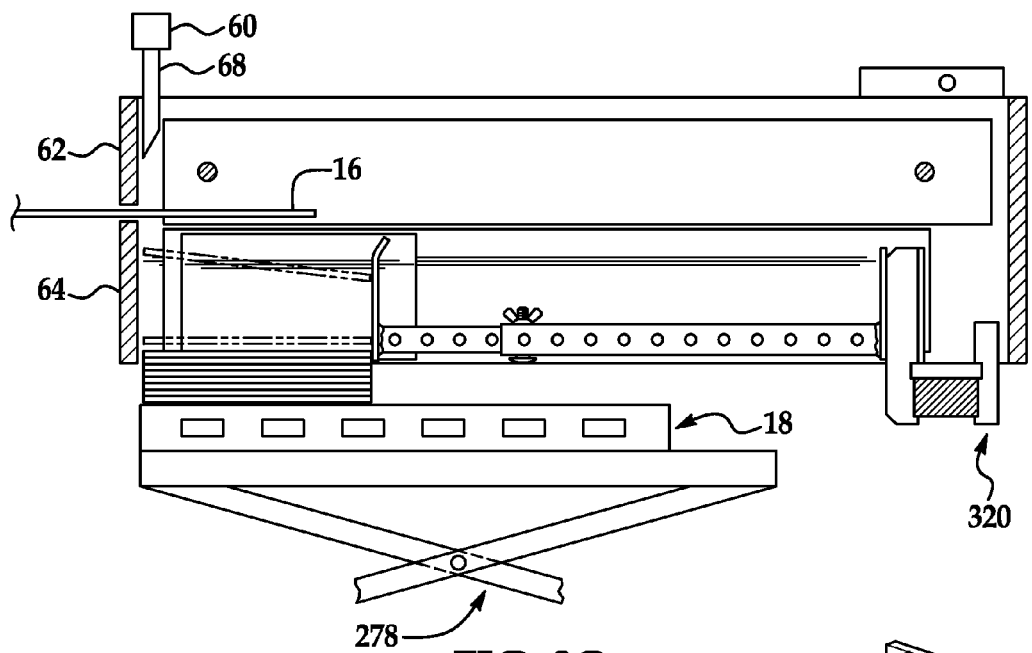
FIG. 8C is a side view of a stacking system with a backstop member in accordance with an exemplary embodiment of the present invention.
Figure 8D:
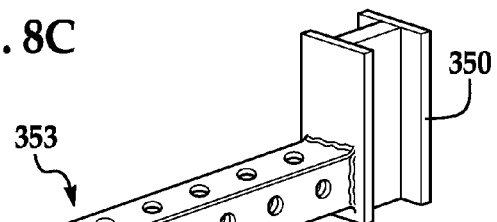

FIG. 8C is a simplified side elevational view in partial cross-section of an unloading and stacking mechanism set up to handle extra short pieces of severed sheet metal successively being advanced out of the precision blanking machine, which also illustrates exemplary embodiments of the present invention, namely an adjustable length removable backstop assembly 350 (also shown in FIGS. 8D-8F) mounted on the improved regular backstops 84 of an exemplary embodiment of the present invention (also shown in at least FIG. 8). FIG. 8D is perspective view of an adjustable length removable backstop assembly 350 of the present invention (also shown in FIG. 8C), which more clearly shows the mounting portion 353 which has a H-shaped cross-section configured to be received within spaced front portions 182, 184. In addition, FIGS. 8E and 8F are perspective views of two fixed length lightweight removable backstop assemblies of alternative exemplary embodiments of the present invention that can be used in the same manner are the FIG. 8D backstop assembly, with the FIG. 8E device being substantially longer than the FIG. 8F device.

There is provided, in accordance with an exemplary embodiment of the present invention, a lightweight hand-removable backstop structure for use in an unloader/stacker to help align short severed pieces of sheet metal that extend over only part of the pallet underneath. This hand-removable backstop may be made in different lengths to handle different lengths of cut metal pieces. Alternatively, it may be constructed out of telescoping interconnected members such as rectangular tubes so that it is adjustable, and can be easily sized as needed to handle a particular length of pieces of sheet metal. These removable backstop structures of the present invention easily set up to extend over part of the pallet, and thus help ensure the formation of a very neat stack of severed pieces of metal successively being advanced out of and transversely cut by the blanking machine.

In one non-limiting exemplary embodiment, each hand-removable backstop structure of the present invention preferably comprises an elongated substantially rigid structure arranged to be removably installed upon and rigidly supported in a position by the backstop support of the unloading and stacking mechanism, and to extend out, preferably substantially horizontally, over a portion of the pallet upon which the severed pieces of cut metal will be stacked. This rigid structure preferably has first, second and third elongated sections, with the first and third sections being generally vertically arranged when the backstop is in use, and the second section being generally horizontally arranged when the backstop is in use. The first section is configured to be hand-mounted upon and mechanically supported by a backstop support. The second section is disposed between and operatively rigidly interconnecting the first and third sections. The third section has at least one substantially flat large surface portion arranged to have a generally vertical orientation when the backstop is in use.

In one embodiment, the substantially rigid elongated structure is made primarily from lightweight metal alloys, and the third section includes a generally flat permanent wall portion 380 to which the substantially flat large surface portion is attached, and the large surface portion may be made from a harder material that is more resistant to wear than the generally flat permanent wall portion.

The backstop of the present invention is of sufficient length in a horizontal direction such that, when it is in use, all of the third section and at least a significant portion of the second section extend over at least part of a pallet positioned therebelow upon which ejected pieces of cut-to-length sheet metal are stacked as they are severed by the blanking machine and dropped into the unloading and stacking mechanism. Also, the large flat surface portion of the third section is configured to be generally perpendicular to the direction of the advancing strips of sheet metal prior to being severed. The backstop is arranged so that its third section will be positioned when in use to restrain the distal edges of the severed cut-to-length pieces of sheet metal as gravity causes them to drop. With the foregoing arrangement, the severed pieces of sheet of sheet metal will thus drop into a very neat stack upon the pallet with their restrained distal edges neatly arranged in a common generally vertical plane.

There is provided, in accordance with another exemplary embodiment of the present invention, an improved backstop assembly for use in an unloading and stacking mechanism of an automatic precision blanking machine. This improved assembly resembles a conventional backstop assembly, except that has extended vertical face surfaces on contact members to help ensure the initial few severed pieces of cut-to-length pieces of sheet metal to drop to a pallet to begin forming a stack do not end up sliding partially under the contact members.

Also, the improved backstop assembly may be each include an upper portions on the faces of the generally vertically arranged projecting contact members that have a slanted surface which extends upwardly and away from the vertically flat part of the face portion therebelow. This slanted surface is preferably sufficiently steeply sloped to assist in ensuring that distal edges of severed cut-to-length pieces of sheet metal fall downwardly toward an area to help create or form a neat stack of cut-to-length pieces.

Another objective of an exemplary embodiment of the present invention is to provide a tool or structure for helping locate the distal edge of the cut pieces that are short and thus do not extend over the full length of the pallet underneath, as such pieces are ejected from the blanking machine into the unloading and stacking mechanism. In other words, the purpose of this tool or structure is to help ensure reliable and very uniform stacking of these shorter piece lengths of cut metal on the pallet.

Still another objective of an exemplary embodiment of the present invention is to provide an improved backstop structure that helps ensure the first few initial cut pieces of sheet metal dropped into a stack on a pallet register correctly, rather than sliding under a portion of the backstop.

During cutting of an order, sheets 16 are guided by dividers 76, top guide 78, side guides 80, 82, and backstop members 83, 84, 85, 86, and 87 to form stacks of a plurality of sheets 16 on skid 18 in an orderly fashion. Ordered stacks of sheets 16 means transverse edges of sheets 16 align substantially in a single plane and longitudinal edges of sheets 16 align substantially in a single plane on skid 18.

Referring to FIGS. 1 and 9-11, skid 18 is provided for supporting a plurality of metal sheets 16. Skid 18 includes a plurality of support members 20, 22, 24, 26 and connecting members 28, 30. It should be noted that the illustrated configuration of skid 18 is one contemplated configuration and exemplary embodiments of the present invention are intended to cover the illustrated and other configurations. Support members can be configured to permit a user to form a skid 18 to suit the configuration of materials to be stacked on the support member or skid 18. Configurations include using one support member sized to receive stackable materials, or a plurality of support members used to form a skid to stack materials on the support members.

Referring to FIGS. 9-11, support members 20, 22, 24, 26 of skid 18 are disposed in a substantially parallel spaced relationship with respect to each other although this is not absolutely necessary as there can be some misalignment as the support members do not have studs that need to be received within the dividers and/or side guides. Connecting members 28, 30 are provided to maintain the spaced relationship of support members 20, 22, 24, 26 with respect to each other. Each of support members 20, 22, 24, 26 has a substantially similar configuration, therefore just the details of support member 20 will be discussed in further detail.

Referring to FIG. 12, support member 20 includes a base member 200, and a plurality of extension members 202, 204, 206, 207, 209, and 211. Of course, the number size and configuration of the extension members may vary. For example, it should be noted that support member 20 may include more extension members of a substantially similar configuration than those shown in FIG. 12. Support member 20 can be constructed of any hard material such as wood, plastic, or metal. In an exemplary embodiment, each support member comprises a base member 200, which in one non-limiting embodiment comprises an elongated tube member. Each tube member includes end portions, which will have a complimentary extension member depending therefrom, and each tube member will comprise a lower surface 220 and upper surface 222. In a non-limiting exemplary embodiment each extension member is substantially a planar shaped member having an upper surface 228, 230, 232, 233, 235, and 237, respectively. In the illustrated embodiment of FIG. 12, extension member 202 is coupled to one end portion and extension member 211 is coupled to the other end portion. Extension members 204, 206, 207, and 209 are spaced along and coupled to the upper surface of the tube member. Extension members 202, 204, 206, 207, 209, and 211 are configured so that all upper surfaces 228, 230, 232, 233, 235, 237 define a substantially single plane that is substantially parallel to a plane defined by the lower surfaces 220 of tube members, respectively. It is intended that when two or more support members are used to form skid 18, materials will be disposed on the upper surfaces of several or on all upper surfaces 228, 230, 232, 233, 235, 237 of extension members 202, 204, 206, 207, 209 and 211, respectively. The configurations of base member 200 and extension members 202, 204, 206, 207, 209, and 211 can vary from that illustrated so long as the relationships among the upper and lower surfaces remain as described. Additionally, it is intended that support members 20, 22, 24, 26 can be formed with the use of fasteners or welded connections. Also, an alternative embodiment could include support members 20, 22, 24, 26 where each member is a mold having a configuration that is substantially similar as that illustrated in FIG. 12.

It should be noted that sheets 16 stacked on upper surfaces 228, 230, 232, 233, 235, 237 of support member 20 can be banded to each other by banding between extension members 202, 204, 206, 207, 209 and 211 and then around sheets 16.

Referring to FIGS. 9-11, support members 20, 22, 24, 26 of skid 18 are maintained in a parallel relationship with connecting members 28, 30. Connecting members 28, 30 also prevent any support member from moving with respect to the other support members in a direction along the length of the base members assuming at least one support member is substantially in a fixed position. Connecting member 28 is configured as an elongated tube member having end portions 256, 258. Connecting member 30 is also configured as an elongated tube member having end portions 260, 262, as illustrated in FIG. 12. Connecting members can be solid, hollow members, or circular in shape.

Referring to FIG. 9, skid 18 is formed by positioning support members 20, 22, 24, 26 in a substantially parallel spaced relationship with respect to each other and then disposing connecting members 28, 30 on the support members. Specifically, once support members 20, 22, 24, 26 are positioned, end portion 256 of connecting member 28 is disposed on upper surface 222 of base member 200 between end extension member 202 and adjacent extension member 206 of support member 20. End portion 258 of connecting member 28 is then disposed on the upper surface of base member between the end extension member and the adjacent extension member of spaced support member 26.

An intermediate portion of connecting member 28 is disposed on the upper surfaces of respective base members of support members 22, 24. In a similar fashion, connecting member 30 is disposed on the upper surfaces of base members between adjacent extension members distal connecting member 28. It should be noted that connecting member 28 or 30 can be spaced apart and disposed on the upper surface of base member between any two extension members of any support members 20, 22, 24, 26. Additionally, due to tolerances of members, some connecting members 28, 30 may not contact an upper surface of base members.

Because support members 20, 22, 24, 26 have a relatively low weight, they can be easily positioned under the stacking mechanism 14 with respect to side guides 80, 82 and backstop members 83, 84, 85, 86, and 87.

Referring to FIGS. 9-11, a method of assembling skid 18 will now be described. The method includes positioning support members 20, 22, 24, 26 in a substantially parallel spaced relationship with respect to each other. The method further includes disposing connecting member 28 on the upper surfaces of the base members such that the connecting member connects support members 20, 22, 24, 26 to maintain their substantially parallel spaced relationship with respect to each other. The method further includes disposing connecting member 30 on the upper surfaces of base members distal connecting member 28 such that it connects support members 20, 22, 24, 26. Skid 18 can be easily separated by just removing connecting members 28, 30 from support members 20, 22, 24, 26. In an alternative embodiment, skid 18 can have a permanent configuration by fixedly coupling (fasteners, welding, etc.) connecting members 28, 30 to the support members 20, 22, 24, 26.

Using the above described method, a user can assemble many configurations of skid 18 depending on the length of support members and the number of support members connected by connecting members. Further, skid 18 is easily separated and support members 20, 22, 24, 26 store easier than a conventional configured pallet. Additionally, skid 18 described above is less costly to repair or replace compared to conventional pallets having a fixed configuration.

Figure 13:
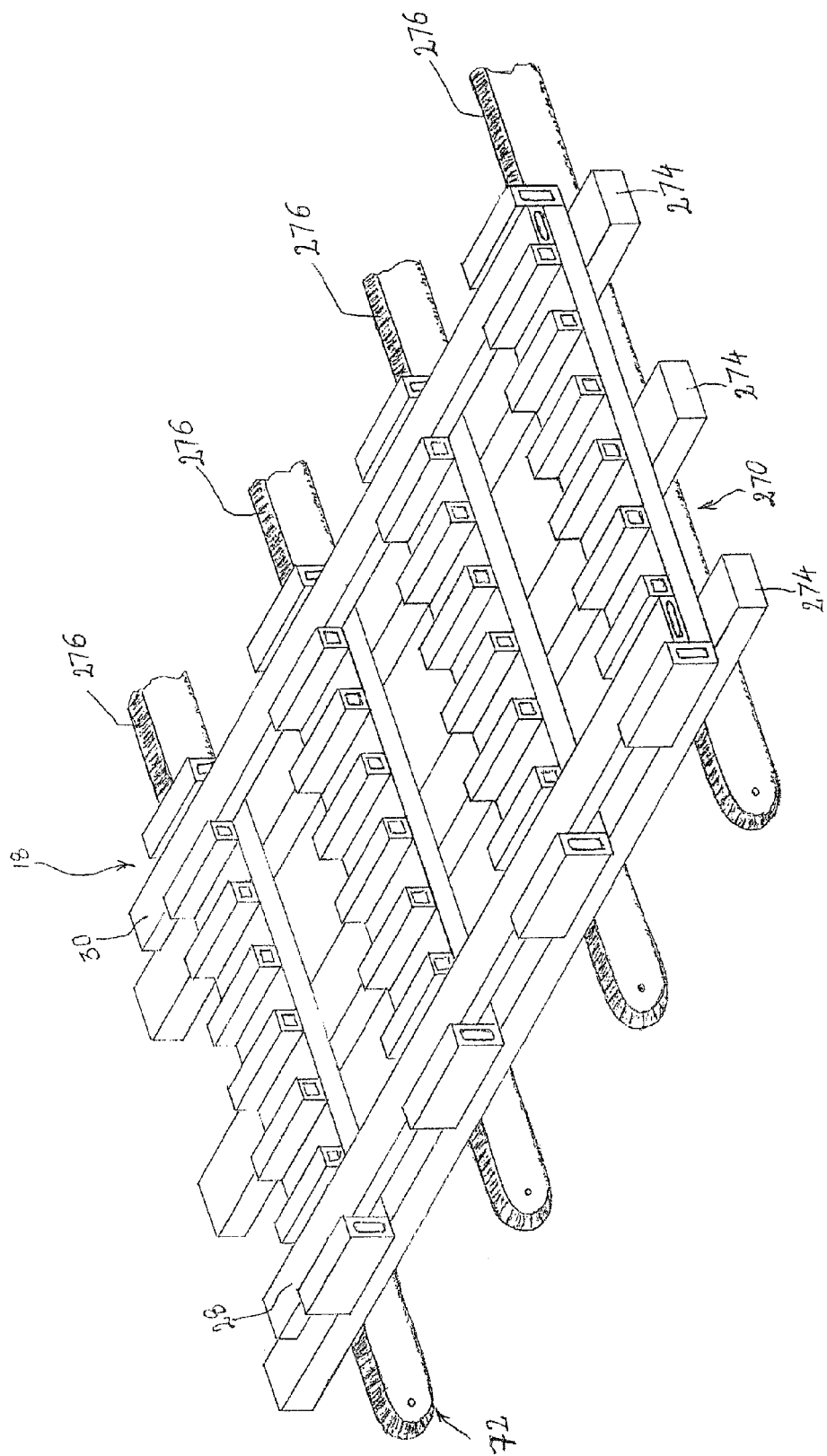
FIG. 13 is a perspective view of a skid on a chain stacker.

Referring to FIGS. 1, 2 and 13, a brief explanation of an exemplary embodiment of the present invention is provided. Initially, skid 18 is disposed on a platform 270 that is disposed on a chain stacker 272 proximate stacking mechanism 14. Platform 270 includes a plurality of substantially flat members 274 whose upper surfaces substantially define a plane. Chain stacker 272 includes a plurality of chains 276. Chains 276 are actuated simultaneously to position platform 270 and skid 18 beneath stacking mechanism 14 in the transverse direction 40. A scissors jack 278 coupled to chain stacker 272 moves chain stacker 272 in an upward direction to position skid 18 proximate the lowest edges of dividers 74 of stacking mechanism 14.

Skid 18 is positioned a relatively short distance beneath dividers 76 so sheets 16 fall a relatively short distance before landing on the upper surfaces 228, 230, 232, 233, 235, 237 of support members of skid 18. Sheets 16 that fall a small distance before landing on skid 18 are more likely to form orderly stacks of sheets 16 on skid 18. It is also desirable to avoid contacting dividers 76 with skid 18 when positioning skid 18 beneath dividers 76 to avoid damaging dividers 76. Side guides 80, 82 are configured to aid in positioning skid 18 close to dividers 76 without damaging dividers 76.

Figure 14:
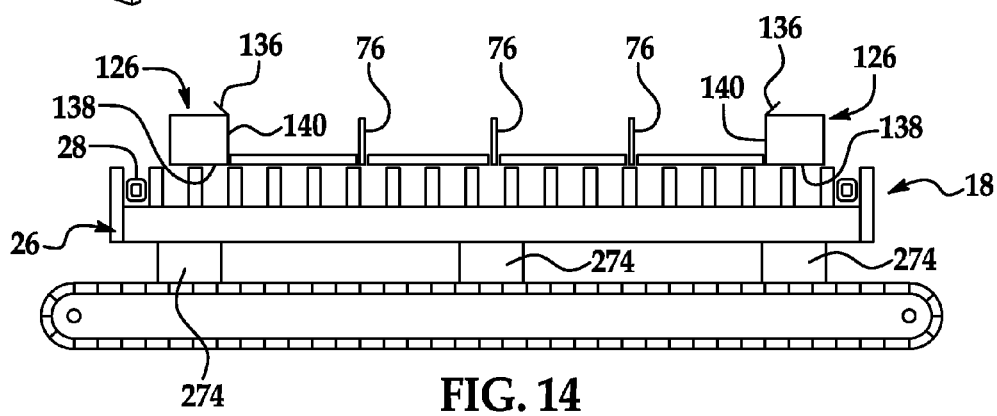
FIG. 14 is a side view of a skid in a transverse direction positioned relative to dividers and side guides of the stacking system of FIG. 2.

Referring to FIG. 14, as skid 18 is moved toward dividers 76 by scissors jack 278, a portion of skid 18 is intended to contact skid contact surface 138 of side guides 80, 82 before skid 18 contacts dividers 76. Thus, damage of the dividers is prevented. Side guides 80, 82 are positioned adjacent to dividers 76 of stacking mechanism 14 so the transverse distance between contact surfaces 140 of workpiece members 136 of side guides 80, 82 substantially corresponds to the total transverse width of sheets 16 severed in blanking machine 12. A user can use scissors jack 278 to urge skid 18 to a position close to dividers 76, then adjust the transverse position of skid 18 to ensure skid contact surface 138 contacts skid 18 before a portion of skid 18 contacts dividers 76.

Stacks of sheets 16 are formed on skid 18 as they are guided from blanking machine 12 by stacking mechanism 14 to skid 18. As the stack height increases, scissors jack 278 is used to lower skid 18 to receive additional sheets 16. When the stacks of sheets 16 reach a predetermined height, scissors jack 278 and chain stacker 272 move skid 18 away from stacking mechanism 14 so sheets 16 can be banded together.

Figure 16:
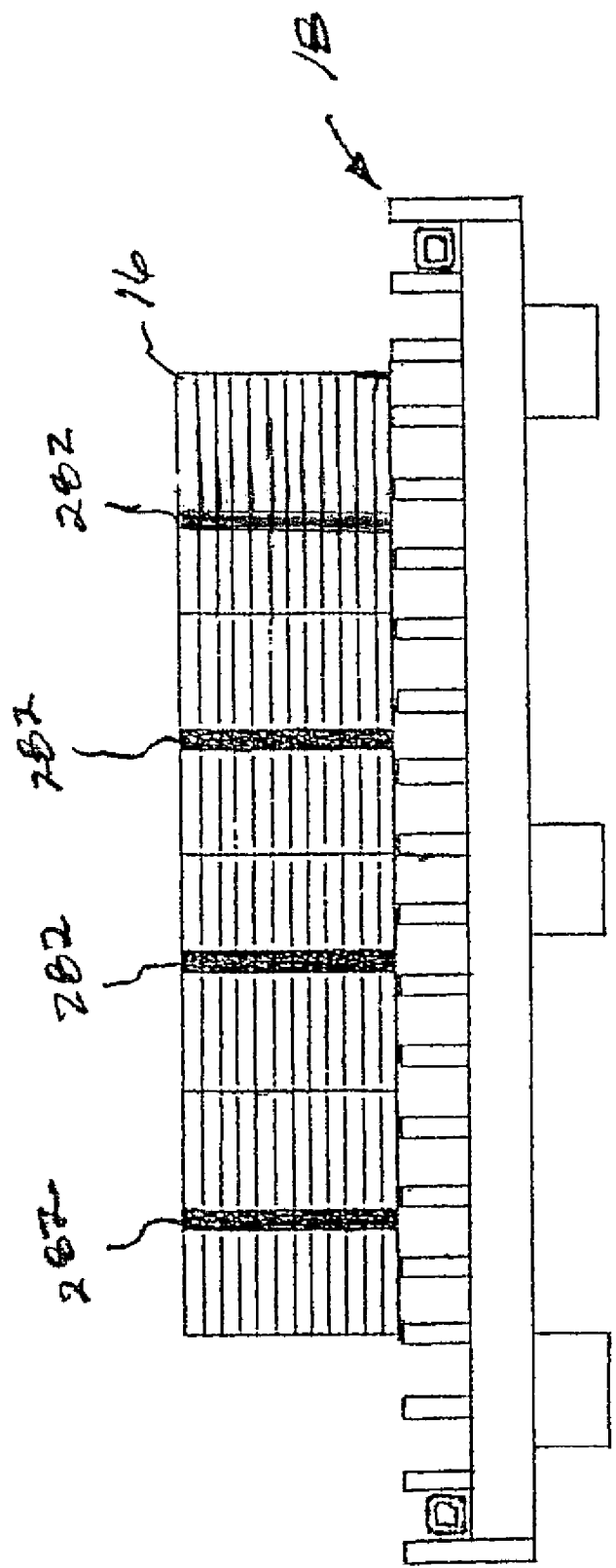
FIG. 16 is a side view of a skid holding a plurality of sheets thereon.

Referring to FIG. 16, stacks of sheets 16 banded together in the longitudinal direction 44 is illustrated. Banding stacks of sheets 16 entails wrapping a stack of sheets 16 tightly together with relatively thin metallic or plastic straps or bands 282.

Figure 17:
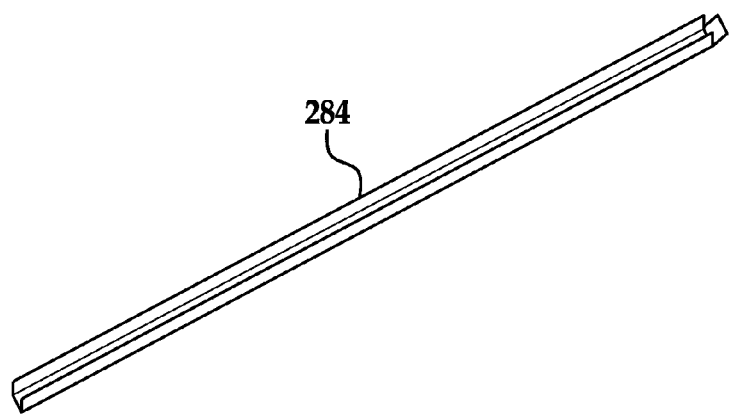
FIG. 17 is a perspective view of a banding tool used to band together a plurality of sheets between the support members of the skid of FIG. 15.

In order to band the stacks of sheets together a banding tool 284 is slid through the openings between the extension members under the stacks of sheets. One exemplary embodiment of banding tool 284 is shown in FIG. 17. The banding tool is used to allow a banding material to be slid from one end of the stack across to another end of the stack. Thereafter, the ends of the banding material, which are at opposite ends of the stack can be secured to each other at the top of the stack in accordance with known methods of strap securement.

By using a banding tool 284 in accordance with an exemplary embodiment of the present invention, strapping 282 can be inserted underneath the stacks between extension members 206 of support members 20, 22, 24, 26 of skid 18. The banding 282 is placed in and slid through the banding tool 284 and the banding is passed along the longitudinal length of sheets 16 and skid 18. The bands 282 are then tightened around sheets 16. In accordance with an exemplary embodiment, banding tool 284 can be made of sheet metal in a configuration as shown in FIG. 17.

Referring now to FIG. 18, stacks of sheets 16 banded together in the longitudinal direction is illustrated. After the stacks of sheets 16 are bound in the longitudinal direction, the stacks of sheets 16 are taken off skid 18 and disposed on transport members 286. The stacks typically are placed on transport members 286 such as wood or metal to keep sheets 16 from being damaged or contacting wet surfaces. Banding can then be applied in the transverse direction 40 to the stacks at multiple locations, as illustrated in FIG. 19.

As illustrated in FIG. 19, the banding can also be placed around transport members 286, wherein the transport members are secured to the stack.

Figure 15:
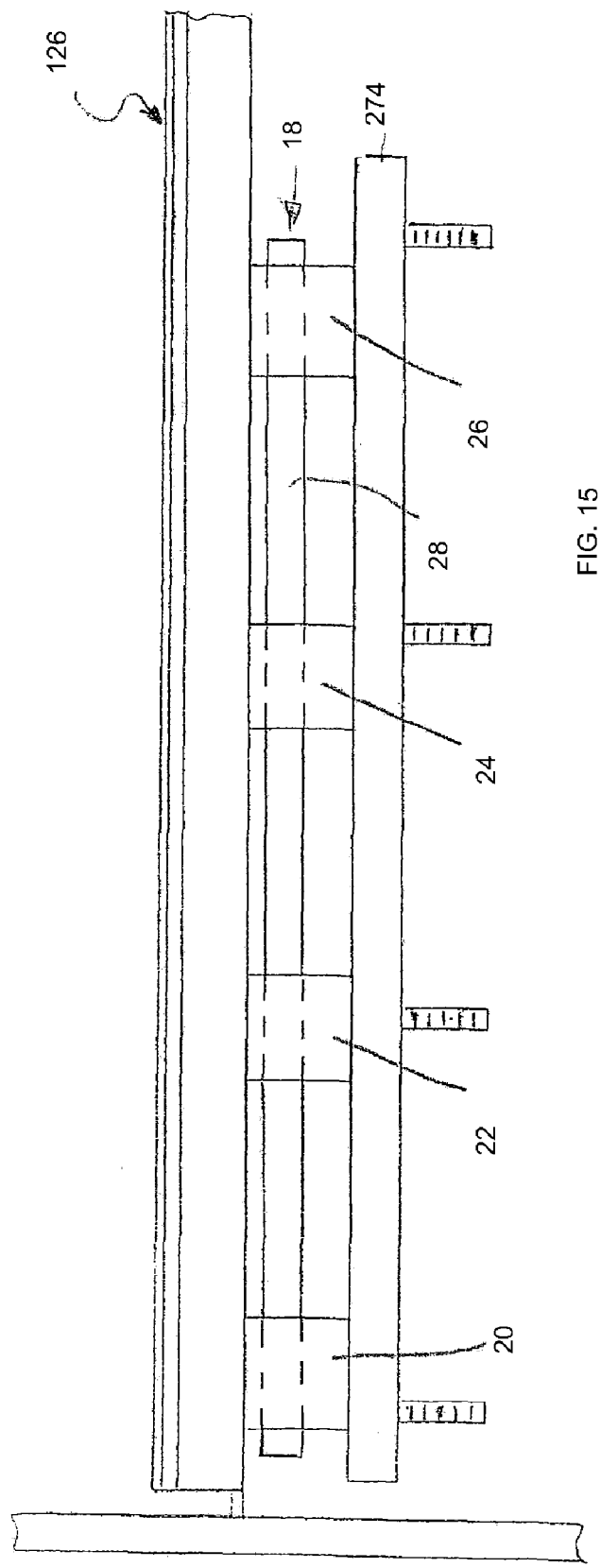
FIG. 15 is a side view of a portion of a skid in a longitudinal direction.

The skid and banding tool 284 allows any lengthwise band 282 to get through for any order (e.g., FIG. 16) and for many different sheet widths because the skid's base member posts (extension members 202, 204, 206, 207, 209 and 211) are 3 inches from each other (FIG. 12). When a process of staking starts, side guides cling to a skid forming one surface together with skid's dividers (FIGS. 14 and 15) wherein the first metal sheets are stacked correctly on the skid. As illustrated in FIG. 3, top guides (78) are used only to stack a few first sheets (16) on the skid. Thereafter, the metal sheets slide down one after another forming a neat full stack. In accordance with an exemplary embodiment, the skid can be made either of steel or aluminum.

The stacking system, skid, and method of assembling the skid provide a substantial advantage over stacking systems using conventional pallets. In particular, the skid is used with orders having varying sized (e.g., width) configurations wherein separately designed base members are not required as there is no need for the extension members of any portion of the skid to be received within areas defined by the dividers.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It should also be noted that the terms "first", "second", "third", "fourth", "up", "down", "vertical", "longitudinal", and "transverse" and the like may be used herein to modify elements performing similar and/or analogous functions or provide orientation among the elements. These modifiers do not imply a spatial, sequential, or hierarchical order to the modified elements unless specifically stated.

What is claimed is:

1. A lightweight hand-removable backstop structure, for use in an unloading and stacking mechanism of an automatic precision blanking machine, the backstop structure being for helping restrain distal edges of cut-to-length pieces of sheet metal that are shorter than a pallet upon which such pieces are stacked as they are severed and ejected from the blanking machine into the unloading and stacking mechanism, in order to ensure very neat stacking of the severed lengths of cut metal successively being advanced out of and severed by the precision blanking machine from a roll of sheet metal, the hand-removable backstop structure comprising:

at least one backstop support; and an elongated substantially rigid structure arranged to be removably installed upon and rigidly supported in position by the at least one backstop support of the unloading and stacking mechanism, the rigid structure having first, second and third elongated sections, with first and third sections being generally vertically arranged when the backstop structure is in use, and second section being generally horizontally arranged when the backstop structure is in use, the first section being configured to be hand-mounted upon and mechanically supported by the backstop support;

the second section being disposed between and operatively rigidly interconnecting the first and third sections, the third section having at least one substantially flat large surface portion arranged to have a generally vertical orientation when the backstop structure is in use, the backstop structure, when in use, being of sufficient length in a horizontal direction such that all of the third section and at least a portion of the second section extend over at least part of a pallet positioned therebelow upon which ejected pieces of cut-to-length sheet metal are stacked as they are severed by the blanking machine and dropped into the unloading and stacking mechanism, the large flat surface portion of the third section being configured to be generally perpendicular to the direction of the advancing strips of sheet metal prior to being severed, and the backstop structure being arranged to be positioned when in use to restrain the distal edges of the severed cut-to-length pieces of sheet metal as gravity causes them to drop, whereby the pieces of sheet of sheet metal drop into a stack upon the pallet with their restrained distal edges neatly arranged in a common generally vertical plane and wherein the backstop support of the unloading and stacking mechanism has two substantially rigid vertically projecting support members each with a generally rectangular horizontal cross-section along most of their length, and spaced apart from one another by a first transverse horizontal distance, and wherein the first section has along at least most of its length an H-shaped horizontal cross-section, whereby the first section may be positioned about the backstop support having two substantially rigid vertically projecting support members spaced apart from one another by a horizontal distance slightly greater than a crossbar portion of the H-shaped cross-section.

2. The hand-removable backstop structure of claim 1, wherein the third section has a first substantially flat small surface portion arranged, when the hand-removable backstop structure is in use, generally above and at an obtuse angle with respect to the large surface portion, the second section has a bottom surface arranged, when the hand-removable backstop structure is in use, to rest upon the portions of the top surface of a pallet upon which severed cut-to-length pieces of sheet metal are to be stacked, and a lower segment of the large surface portion of the third section extends beneath the bottom surface of the second section, whereby the lower segment may be positioned, when the hand-removable backstop structure is in use, below the top surface of the pallet by being positioned to fall within an opening provided in the top surface of the pallet, thereby ensuring that a generally vertical wall all the way to the top surface of the pallet is provided, so that even the initial cut-to-length pieces of sheet metal upon the stack are properly registered along the generally vertical wall formed by the large surface portion of the third section.

3. The hand-removable backstop structure of claim 1, wherein the elongated substantially rigid structure is formed from first, second and third structural members which are initially made separately and subsequently joined together, and which correspond respectively to the first, second and third sections of the substantially rigid structure, and the second structural member includes at least a first elongated wall portion having a length at least twice its width, the first elongated wall portion being rigidly attached to at least one of the first and third formed members.

4. The hand-removable backstop structure of claim 1, wherein the second section is formed from first and second telescoping members and releasable mechanical restraint means for rigidly interconnecting the first and second telescoping members together, the first telescoping members being rigidly interconnected to the first section of the backstop, and the second telescoping member being rigidly interconnected to the third section of the backstop, the releasable mechanical restraint means being arranged to provide adjustable set up of the second section between at least three different positions that each provide a different overall length for the second section, by releasing the mechanical restraint means, making a desired length adjustment, and re-engaging the mechanical restraint means, whereby the backstop may be adjusted by an operator during set up to any one of at least three different overall lengths.

5. The hand removable backstop structure of claim 4, wherein first and second telescoping members each are substantially hollow, each have at first and second opposed elongated wall portions and each have a substantially uniform cross-section along at least most of their length, the uniform cross-sections of the first and second telescoping members being slightly different and size and complementary to one another to allow the first and second telescoping members to be slidably positioned with respect to one another when the mechanical restraint means is released; the first telescoping member has at least three pairs of through-holes in the first and second opposed wall portions thereof, each pair of holes being arranged directly opposite one another, such that an elongated removable fastener may be placed through any pair of the holes; the second telescoping member has at least three pairs of through-holes in the first and second opposed wall portions thereof, each pair of holes being arranged directly opposite one another, such that an elongated removable fastener may be placed through any pair of the holes; and the releasable mechanical restraint means includes at least one removable elongated fastener which is operable, during set up of the overall length of the backstop, to be placed through a first selected pair of opposed holes in the first telescoping member and a second selected pair of opposed holes in the second telescoping member that are in substantial registration with the first selected set of opposed holes, whereby the overall length of the backstop is determined by which pairs of opposed holes in the first and second telescoping members are selected.

6. The hand removable backstop structure of claim 1, wherein the substantially rigid elongated structure is made primarily from lightweight metal alloys, and the third section includes a generally flat wall portion to which the substantially flat large surface portion is attached, and the large surface portion may be made from a harder material that is more resistant to wear than the generally flat wall portion.

7. The hand removable backstop structure of claim 1, wherein the third section further comprises an upper portion extending from the face of the substantially flat surface, wherein the upper portion has a slanted surface which extends upwardly and away from the substantially flat surface.

8. In combination a hand-removable backstop support and an elongated substantially rigid structure for use in an unloading and stacking mechanism of a precision blanking machine, the elongated substantially rigid structure configured to be removably installed upon and rigidly supported in position by the hand-removable backstop support, the rigid structure having first, second and third elongated sections, with first and third sections being generally vertically arranged and at opposite ends of the elongated substantially rigid structure and second section extending between the first and third sections, wherein the first section is configured to be hand-mounted upon and mechanically supported between two vertical members of the backstop support and wherein the third section has at least one substantially flat large surface portion arranged to have a generally vertical orientation when the elongated substantially rigid structure is secured to the hand-removable backstop support and wherein the second section is configured to provide an adjustable length.

9. The hand-removable backstop structure and elongated substantially rigid structure as in claim 8, wherein the first section of the elongated substantially rigid structure has an H-shaped horizontal cross-section configured to be received between the two vertical members of the backstop support.

10. The hand-removable backstop structure and elongated substantially rigid structure as in claim 9, wherein the third section further comprises an upper portion extending from the face of the substantially flat surface, wherein the upper portion has a slanted surface which extends upwardly and away from the substantially flat surface.

11. The hand-removable backstop structure and elongated substantially rigid structure as in claim 8, wherein the third section further comprises an upper portion extending from the face of the substantially flat surface, wherein the upper portion has a slanted surface which extends upwardly and away from the substantially flat surface.

12. A method of providing an adjustable contact surface of a hand-removable backstop structure, for use with an unloading and stacking mechanism of an automatic precision blanking machine, the method comprising:

securing at least one backstop support to the unloading and stacking mechanism;

removably securing an elongated substantially rigid structure to the at least one backstop support, the elongated substantially rigid structure having first, second and third elongated sections, with the first and third sections being disposed at either end of the elongated substantially rigid structure and generally vertically arranged when the backstop structure is secured to the at least one backstop support, and the second section extends between the first and second sections and is generally horizontally arranged when the backstop structure is secured to the at least one backstop support, wherein the first section is configured to be hand-mounted upon and mechanically supported by the backstop support and the first section is configured to be hand-removed from the backstop support and wherein the second section adjustably and rigidly interconnects the first and third sections and wherein the third section has at least one substantially flat large surface portion arranged to have a generally vertical orientation when the elongated substantially rigid structure is secured to the at least one backstop support, wherein the first section is configured to be hand-mounted upon and mechanically supported between two vertical members of the backstop support and wherein the first section of the elongated substantially rigid structure has an H-shaped horizontal cross-section configured to be received between the two vertical members of the backstop support.

13. The method as in claim 12, wherein the third section further comprises an upper portion extending from the face of the substantially flat surface, wherein the upper portion has a slanted surface which extends upwardly and away from the substantially flat surface.

14. The method as in claim 12, wherein the third section further comprises an upper portion extending from the face of the substantially flat surface, wherein the upper portion has a slanted surface which extends upwardly and away from the substantially flat surface.

\* \* \* \* \*